United States Patent
Muchherla et al.

(10) Patent No.: US 11,301,143 B2
(45) Date of Patent: Apr. 12, 2022

(54) SELECTIVE ACCELERATED SAMPLING OF FAILURE-SENSITIVE MEMORY PAGES

(71) Applicant: Micron Technology, Inc., Boise, ID (US)

(72) Inventors: Kishore Kumar Muchherla, Fremont, CA (US); Gary F. Besinga, Boise, ID (US); Cory M. Steinmetz, Boise, ID (US); Pushpa Seetamraju, San Jose, CA (US); Jiangang Wu, Milpitas, CA (US); Sampath K. Ratnam, Boise, ID (US); Peter Feeley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 239 days.

(21) Appl. No.: 16/432,786

(22) Filed: Jun. 5, 2019

(65) Prior Publication Data
US 2020/0387324 A1 Dec. 10, 2020

(51) Int. Cl.
*G06F 3/06* (2006.01)

(52) U.S. Cl.
CPC .......... *G06F 3/0619* (2013.01); *G06F 3/0604* (2013.01); *G06F 3/064* (2013.01); *G06F 3/0653* (2013.01); *G06F 3/0659* (2013.01); *G06F 3/0673* (2013.01); *G06F 3/0679* (2013.01)

(58) Field of Classification Search
CPC .. G06F 12/0246; G06F 3/0679; G06F 11/106; G06F 3/0619; G06F 3/0653; G06F 3/0673; G06F 3/0604; G06F 3/064; G06F 3/0659

USPC .......................................................... 711/103
See application file for complete search history.

(56) References Cited

U.S. PATENT DOCUMENTS

| | | | | |
|---|---|---|---|---|
| 9,229,854 B1* | 1/2016 | Kuzmin | ............... | G06F 11/1072 |
| 10,222,984 B1* | 3/2019 | O'Brien, III | .......... | G06F 3/0688 |
| 10,445,229 B1* | 10/2019 | Kuzmin | ................ | G06F 3/0659 |
| 2008/0239808 A1* | 10/2008 | Lin | ........................ | G06F 11/106 |
| | | | | 365/185.09 |
| 2009/0196102 A1* | 8/2009 | Kim | ........................ | G11C 8/08 |
| | | | | 365/185.11 |
| 2010/0205504 A1* | 8/2010 | Fung | ...................... | H03M 13/19 |
| | | | | 714/752 |
| 2011/0138104 A1* | 6/2011 | Franceschini | ....... | G06F 12/0246 |
| | | | | 711/103 |

(Continued)

OTHER PUBLICATIONS

Read Disturb Errors in MLC NAND Flash Memory: Characterization, Mitigation, and Recovery by Cai (Year: 2012).*

(Continued)

*Primary Examiner* — Paul M Knight
(74) *Attorney, Agent, or Firm* — Lowenstein Sandler LLP

(57) ABSTRACT

A processing device in a memory system determines sensitivity value of a memory page in the memory system. The processing device assigns the memory page to a sensitivity tier of a plurality of sensitivity tiers based on a corresponding sensitivity value, wherein each sensitivity tier has a corresponding range of sensitivity values. The processing device further determines a targeted scan interval for each sensitivity tier of the plurality of sensitivity tiers and scans a subset of a plurality of memory pages in the memory component, wherein the subset comprises a number of memory pages from each sensitivity tier determined according to the corresponding targeted scan interval of each sensitivity tier.

18 Claims, 7 Drawing Sheets

(56) References Cited

U.S. PATENT DOCUMENTS

| | | | | |
|---|---|---|---|---|
| 2016/0350187 | A1* | 12/2016 | Saliba | H03M 13/353 |
| 2018/0357142 | A1* | 12/2018 | Wong | G06F 11/1441 |
| 2019/0138226 | A1* | 5/2019 | Kanno | G06F 3/0679 |
| 2019/0221273 | A1* | 7/2019 | Parkinson | G06F 3/0619 |
| 2019/0227732 | A1* | 7/2019 | Jung | G06F 11/106 |
| 2020/0004439 | A1* | 1/2020 | Borlick | G06F 11/106 |
| 2020/0135293 | A1* | 4/2020 | Raychaudhuri | G06F 3/0638 |
| 2020/0218599 | A1* | 7/2020 | Elliott | G06F 11/106 |
| 2020/0257621 | A1* | 8/2020 | Pletka | G06F 12/0253 |

OTHER PUBLICATIONS

Investopedia; Definition of Systematic Sampling (Year: 2020).*
Improving PCM Endurance with a Constant-Cost Wear Leveling Design by Chang (Year: 2016).*
Understanding Flash Memory by Col (Year: 2017).*
Vulnerabilities in MLC NAND Flash Memory Programming: Experimental Analysis, Exploits, and Mitigation Techniques by Cai (Year: 2017).*
A 512-GB 3-b/Cell 64-Stacked WL 3-D-NAND Flash Memory by Kim (Year: 2018).*

* cited by examiner

SELECTIVE ACCELERATED SAMPLING OF FAILURE-SENSITIVE MEMORY PAGES

TECHNICAL FIELD

Embodiments of the disclosure relate generally to memory sub-systems, and more specifically, relate to selective accelerated sampling of failure-sensitive memory pages.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
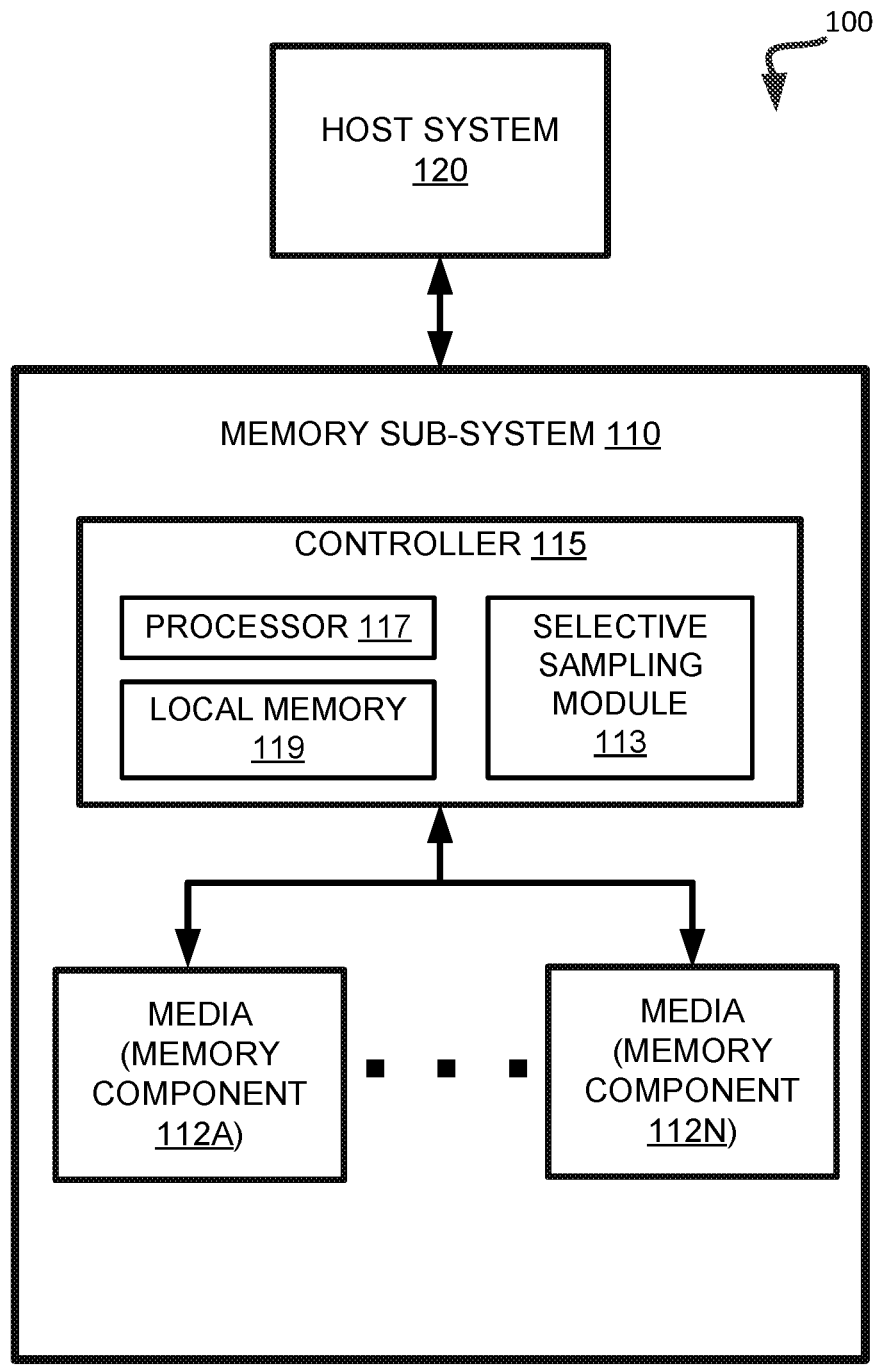
FIG. 1 illustrates an example computing environment that includes a memory sub-system in accordance with some embodiments of the present disclosure.

Aspects of the present disclosure are directed to selective accelerated sampling of failure-sensitive memory pages in a memory sub-system. An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components (also hereinafter referred to as "memory devices"). The host system can provide data to be stored at the memory sub-system and can request data to be retrieved from the memory sub-system.

A memory component in a memory sub-system can include memory cells that can include one or more memory pages (also referred to herein as "pages") for storing one or more bits of binary data corresponding to data received from the host system. Multiple memory cells of the memory component can be grouped together to form a memory block. As data gets written to a memory cell of the memory component for storage, the memory cell, with time, can deteriorate. For example, when too many read and write operations are performed on a memory cell, data stored at the memory cell and adjacent memory cells of the memory component can become corrupted or incorrectly stored at the memory cell due to various failure mechanisms (e.g. read disturb error, cross-temperature issues, data retention issues, etc.). A read disturb error occurs when a read to a particular location (e.g., one row of a memory cell of a block) of the memory sub-system impacts the threshold voltages of unread adjacent locations (e.g., different rows of the same block). Data retention issues can occur when the memory sub-system is operated in a high temperature environment as the memory cells lose charges over time when operating at high temperature. A cross temperature failure can occur when operating the memory sub-system in an environment with widely varying temperatures such that a memory cell is programed at a given temperature and later read at a significantly different temperature. These failure mechanisms can result in a higher error rate of the data stored in the memory cell, thus triggering a need for the memory sub-system to perform a data integrity check (also referred to herein as a "scan") to verify that the data stored at each data block does not include any errors. During the data integrity check, one or more reliability statistics are determined for data stored at the data block. One example of a reliability statistic is raw bit error rate (RBER). The RBER corresponds to a number of bit errors per codeword that the data stored at the data block experiences. A codeword may refer to the smallest read unit allowed. The rate of RBER degradation can vary from one word line to another word line and can also vary from one failure mechanism to another. Therefore, a scanning mechanism that ensure adequate sampling of word lines across all memory blocks based on word line sensitivity is preferred.

However, the scanning operation for data integrity checks is costly and may introduce latency due to the read operations, repeated error detection, and correction operations. For a given memory block, if every word line is scanned (error detection) and then possibly exposed to a correction operation (error control operation), this can result in a reduction of the performance of a conventional memory sub-system. In addition, as the error rate for a memory cell or data block continues to increase, it may even surpass the error correction capabilities of the memory sub-system, leading to an irreparable loss of the data. Furthermore, as more resources of the memory sub-system are used to perform the error control operation, fewer resources are available to perform other read operations or write operations. Therefore, scanning operation coverage (which word lines to scan) and frequency (how often to run a scan) can be tuned to minimize latency and performance penalties.

Conventionally, popular scanning practices include scanning only a subset of memory blocks based on the memory system's use of the blocks. For example, if the number of read operations experienced by a memory block is greater than a scanning threshold then the memory block is a candidate for scanning. While selective scanning in this manner may improve latency, scanning solely based on the frequency of use of the memory block may not guarantee that memory pages that are sensitive to certain failure mechanisms will be scanned adequately. For example, a memory page that is vulnerable to read disturb error and located in memory block A may be scanned if the number of reads of memory block A exceeds the scanning threshold, whereas another memory page also vulnerable to read disturb but located in memory block B may not be scanned if the number of reads of memory block B are below the scanning threshold.

Another conventional criterion for scanning may be the relative age of the memory block, such that older blocks may be scanned while newer blocks are passed over for scanning. Another existing scanning practice includes scanning every page in every memory block for error detection and correction. While this approach provides ultimate coverage for error detection, the scanning process in this case is largely time consuming and may take several months for the entire memory component to be scanned. Accordingly, a different scanning technique may be preferred to improve performance and reduce latency, while ensuring adequate scanning coverage for failure-sensitive memory pages.

Aspects of the disclosure address the above and other deficiencies by implementing selective accelerated sampling of failure-sensitive memory pages in a memory sub-system. In one implementation, the memory sub-system can initially determine a sensitivity value for each memory page in each memory block in the sub-system based on susceptibility of the memory page to failure mechanisms related to cross-temperature, read disturb, and retention response of the word-line. The memory sub-system can include a collection of sensitivity tiers with each tier encompassing a range of sensitivity values and. Memory pages can be assigned sensitivity tiers based on matching the sensitivity value of a memory page with the range of sensitivity values of a sensitivity tier. Selectively sampling memory pages based on failure sensitivity can eliminate the need for an additional scan module that scans the sensitive pages periodically, thus eliminating the need for the validation effort. Aspects of the disclosure also enables sampling the memory sub-system at a slower rate and sampling the most sensitive pages at a faster rate without impacting the system's performance and latency. Additionally, aspects of the disclosure can enable a new failure matrix to be identified during the lifetime of the memory component and a resulting list of sensitive memory pages to be integrated into the sampling process with a least development and integration overhead.

As will be described in more detail herein, in one implementation, a targeted scan interval for each sensitivity tier can be determined based on the physical characteristics of the memory component including system specifications, memory cell margins, and failure sensitivity of the memory component. The targeted scan interval of a sensitivity tier may represent the period of time when the memory pages assigned to the sensitivity tier need to be scanned (e.g. every three days, weekly, monthly, etc.). In one implementation, a sensitivity tier with higher sensitivity values can have a smaller targeted scan interval (i.e. may be scanned more frequently) than a sensitivity tier with lower sensitivity values. The memory sub-system can periodically scan a subset of memory pages from each sensitivity tier in the collection of sensitivity tiers as determined by the targeted scan interval of each sensitivity tier.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120.

Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EE-PROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data. The data blocks can be further grouped into one or more planes on each of memory components 112A to 112N, where operations can be performed on each of the planes concurrently. Corresponding data blocks from different planes can be associated with one another in a stripe than spans across multiple planes.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a selective sampling module 113 that can be used to selectively sample memory pages in one or more of memory components 112A to 112N of memory sub-system 110, based on a sensitivity value of each memory page to one or more failure mechanisms. In one implementation, memory sub-system 110 can determine a sensitivity value for each memory page based on the page's susceptibility to one or more failure metrics as indicated by the physical characteristics of the word-line associated with the page (e.g. width of the word-line). Relevant failure metrics include, but are not limited to, cross-temperature, read disturb, and retention response of the word-line. Memory sub-system 110 can include a collection of sensitivity tiers with each tier encompassing a range of sensitivity values and selective sampling module 113 can assign a memory page to a static page list or a dynamic page list of one of the sensitivity tiers where the sensitivity value of the memory page lies within the range of sensitivity values of the tier. A static page list can be determined based on process-related characteristics of the memory component (e.g. qualification data of the memory component). A dynamic page list can be updated subsequent to the initial creation of the list where pages can be added to the list based on certain criterion (e.g. a certain refresh rate of a memory block caused by the memory page). Selective sampling module 113 can determine a targeted scan interval for each sensitivity tier based on the physical characteristics of the memory component including system specification, memory cell margins, and failure sensitivity of the memory component. The targeted scan interval of a sensitivity tier can represent a period of time where some percentage of the memory pages assigned to the sensitivity tier may be scanned, such that a sensitivity tier with higher sensitivity values can have a smaller targeted scan interval (i.e. may be scanned more frequently) than a sensitivity tier with lower sensitivity values. Memory sub-system 110 can periodically scan a subset of memory pages from each sensitivity tier in the collection of sensitivity tiers as determined by the targeted scan interval of each sensitivity tier. In one implementation, the full list of pages to be scanned at a given time (also referred to herein as "media scan sample") can be divided into multiple portions, each portion allocated for one sensitivity tier, and the percentage of the media scan sample allocated to each portion can be proportionate with the sensitivity level of each sensitivity tier. For example, the percentage of the media scan sample allocated to each sensitivity tier may be based on the targeted scan interval of the sensitivity tier and an operating model of memory sub-system 110. The operating model of the memory sub-system 110 is the number of hours per day during which the memory sub-system is expected to be powered on (e.g. 8 hours per day).

Figure 2:
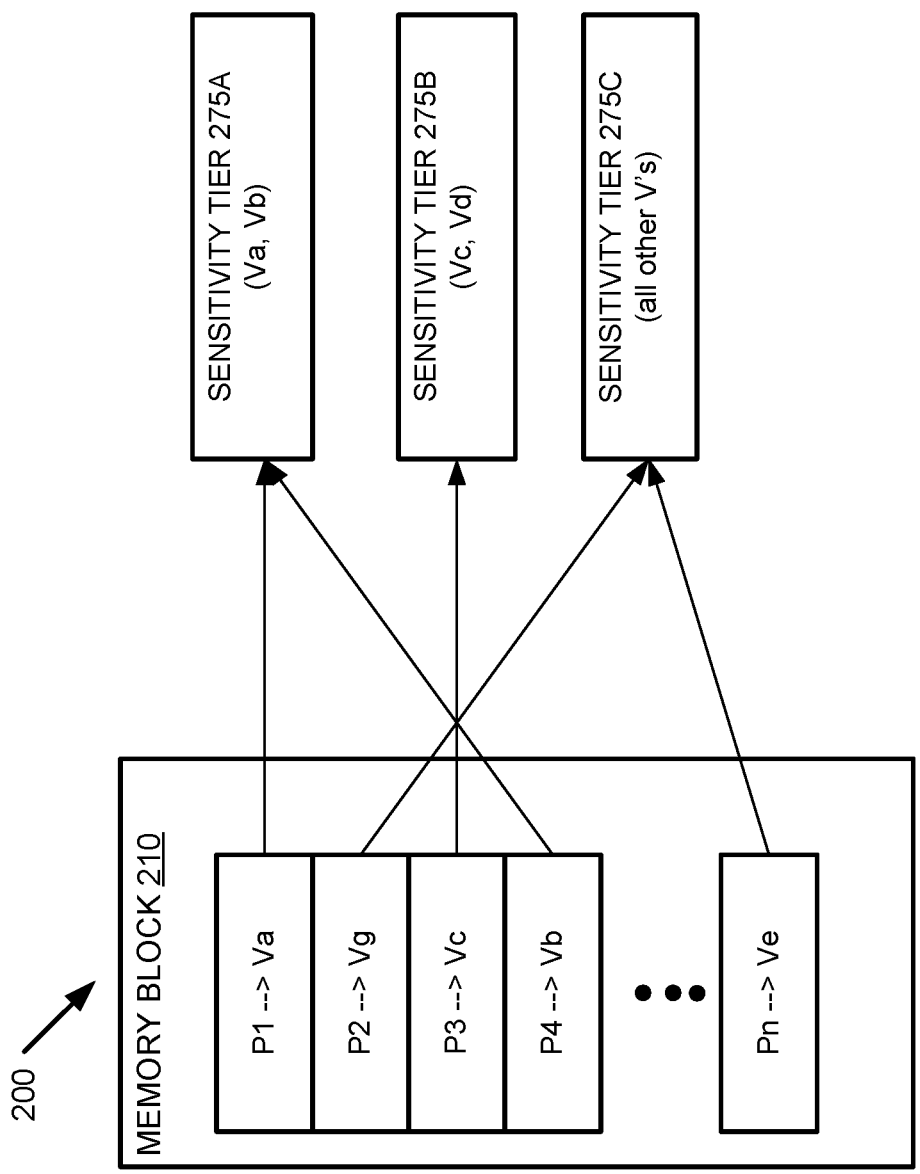
FIG. 2 is a block diagram illustrating the assignment of memory pages in a memory block to sensitivity tiers in accordance with some embodiments of the present disclosure.

FIG. 2 is a block diagram 200 illustrating the assignment of memory pages in a memory block to sensitivity tiers in accordance with some embodiments of the present disclosure. In one implementation, the memory block 210 can include memory pages P1 to Pn of various sensitivity values Va to Vn. Each memory component 112A-N of FIG. 1 can contain hundreds of memory blocks. Each memory page P can be assigned a sensitivity value V based on the page's susceptibility to one or more failure metrics as indicated by the physical characteristics of the word-line associated with the memory page (e.g. width of the word-line). Relevant failure metrics include cross-temperature, read disturb, and retention response of the word-line corresponding to the memory page. For example, if the sensitivity to cross-temperature for a word-line of a memory page results in a first sensitivity value, as the cross-temperature for the word-line increases the sensitivity value for the memory page can change. Similarly for read disturb, the sensitivity value of a memory page can increase as the read disturb capability of a word-line of the page increases. Along the same lines, as the retention margin of a word-line of the memory page increases, thus causing more retention exposure, the sensitivity value of the memory page can increase.

In one implementation, multiple sensitivity tiers 275A-C can be defined in the memory sub-system, and each sensitivity tier can include a range of sensitivity values (Vx, Vy, etc.). FIG. 2 illustrates an implementation where there are three sensitivity tiers 275A-C. In other implementations, however, there may be some other number of sensitivity tiers defined in the memory sub-system, such as two sensitivity tiers, four sensitivity tiers, five sensitivity tiers, etc. Each memory page P may be assigned to only one of sensitivity tiers 275A-C where the sensitivity value of the memory page P matches one of the sensitivity values of the corresponding sensitivity tier. For example, memory page P1 with sensitivity value Va and memory page P4 with sensitivity value Vb can be assigned to sensitivity tier 275A because the set of sensitivity values of tier 275A includes the sensitivity values Va and Vb. Similarly, memory page P3 with sensitivity value Vc can be assigned to sensitivity tier 275B because the set of sensitivity values of tier 275B includes the sensitivity value Vc.

In one implementation, a sensitivity tier can include a sensitivity value criterion that is defined as any sensitivity value that is not covered by any other sensitivity tier. For example, sensitivity tier 275C can have sensitivity value criteria defined as any sensitivity value except (Va, Vb, Vc, Vd) because those values have been reserved for sensitivity tiers 275A and 275B. Accordingly, memory pages P2 with sensitivity value Vg and Pn with sensitivity value Ve can be assigned to sensitivity tier 275C. In another implementation, a collection of memory pages physically located at uniform intervals in memory block 210 (e.g. using a round robin algorithm, every fourth page in memory block 210) can be assigned to a sensitivity tier, regardless of the pages' sensitivity values. This selection criteria may be helpful to ensure adequate sampling of memory pages across the entire memory block 210, for example to detect unforeseen errors that may not yet have been translated to memory page sensitivity values.

Figure 3:
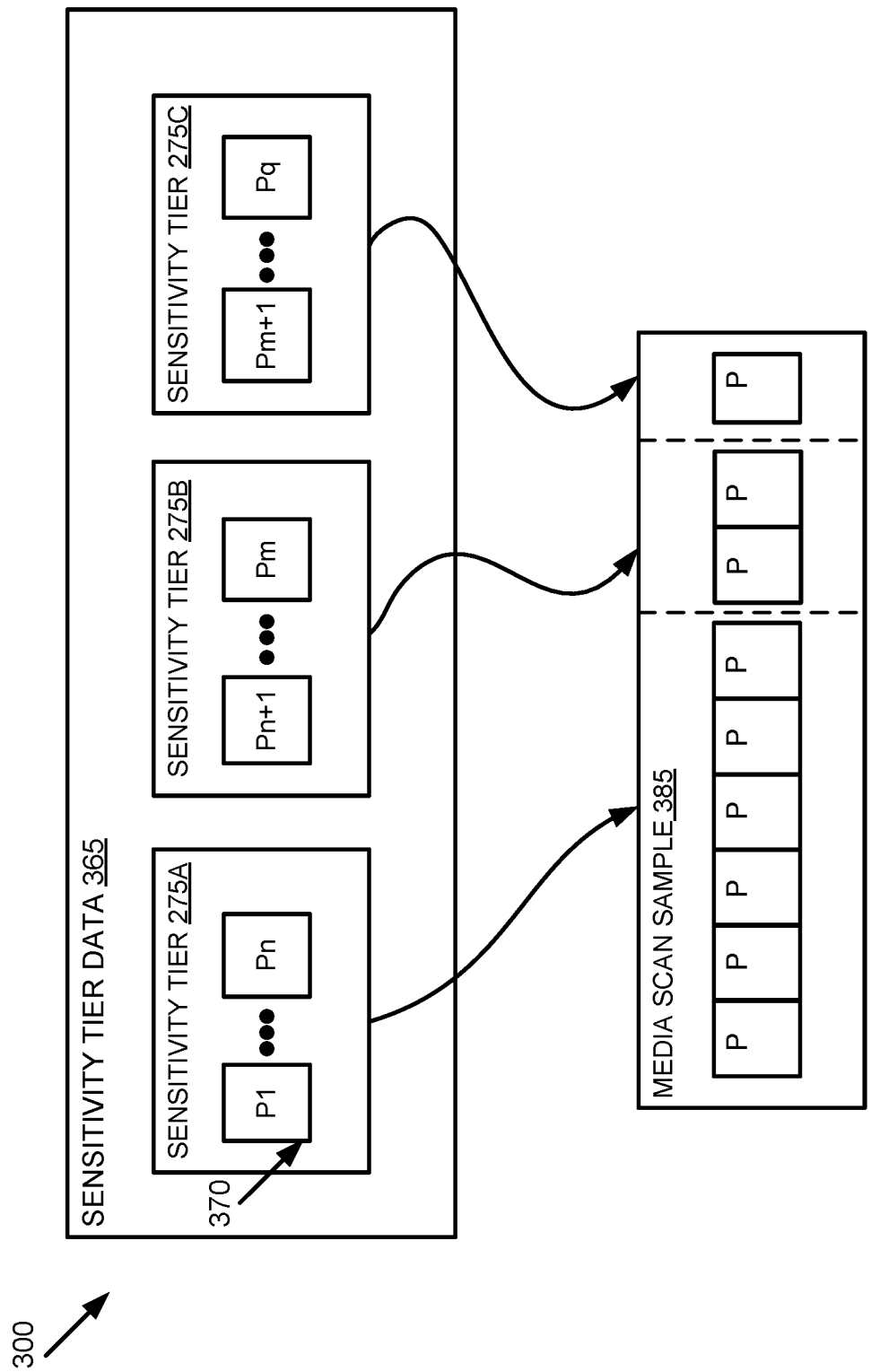
FIG. 3 is a block diagram illustrating the percentage allocation of the media scan sample to multiple sensitivity tiers in accordance with some embodiments of the present disclosure.

FIG. 3 is a block diagram 300 illustrating the percentage allocation of the media scan sample to multiple sensitivity tiers in accordance with some embodiments of the present disclosure. In one implementation, sensitivity tier data 365 can include the collection of sensitivity tiers 275A-C where memory pages within memory components 112A-N can be assigned. For each sensitivity tier 275A-C, an exclusive range of sensitivity values associated with the sensitivity tier may be determined. In another example, a discrete set of sensitivity values associated with the sensitivity tier may be determined. In addition to the associated sensitivity values, the data for each sensitivity tier 275A-C include a list of memory pages assigned to the sensitivity tier based on the sensitivity value of each memory page. For example, sensitivity tier 275A can include a list of memory pages 370 where the sensitivity value of each page matches a sensitivity value within the range of sensitivity values associated with sensitivity tier 275A.

In one implementation, selective sampling module 113 can build media scan sample 385 that may be scanned at a given time, and that consists of multiple memory pages from each sensitivity tier 275A-C according for some predetermined percentage allocation criteria for each tier. In one implementation, the percentage of the media scan sample allocated to each sensitivity tier can be proportionate with the sensitivity level of each sensitivity tier 275A-C. For example, the percentage of the media scan sample allocated to each sensitivity tier may be based on a targeted scan interval (e.g. every three days, weekly, monthly, etc.) of the sensitivity tier and an operating model of memory sub-system 110 (e.g. the memory is actively sampling for 8 hours per day). The targeted scan interval of each sensitivity tier may be determined based on one or more factors including the memory sub-system specifications, the rate of running the scan, the failure sensitivity of memory pages within the tier, memory cell margins, and the operating model of the memory component (e.g. number of power-on hours per day).

In another implementation, selective sampling module 113 can build media scan sample 385 by defining a number of media scan slots to which a list of memory pages from each sensitivity tier can be assigned. In this case, a subset of the media scan slots can be assigned to each sensitivity tier 275A-C. The subset of the media scan slots can be proportionate with the sensitivity level of each sensitivity tier. For example, a first subset of slots assigned to a first sensitivity tier can have more slots than a second subset of slots assigned to a second sensitivity tier when the sensitivity values corresponding to the first tier are greater than the sensitivity values corresponding to the second tier. Prior to performing each scan job, the media scan slots can be populated with memory pages from each sensitivity tier according to the subset of media scan slots assigned to the respective tier. Alternatively, the media scan slots can be populated dynamically, while the scan job is running, with memory pages from sensitivity tiers according to the targeted scan interval of each sensitivity tier.

In an illustrative example, assuming that memory sub-system 110 contains 1 million memory pages, and assuming hypothetically that out of the 1 million pages, memory sub-system 110 contains 5000 pages in the high sensitivity tier. Assuming also that the power-on time of the memory sub-system is 8 hours per day, that according to the system specifications, memory pages in the high sensitivity tier need to be scanned at least once every 5 days (this represents the targeted scanning interval for the high sensitivity tier), and that the selective sampling module 113 is able to scan 4 memory pages per minute. Under this hypothetical, the percentage of scan sample allocated to the high sensitivity tier may be calculated as the total number of sensitivity pages (5000) divided by the total number of pages that may be scanned in 5 days (4 pages/min×60 mins/hours×8 hours/day×5 days)=9700. Resulting in (5000/9700) %=55%. Therefore, in order to sample all sensitive pages every 5 days, the media scan sample may need to allocate approximately 55% of its total memory pages to the high sensitivity tier.

In another implementation of the present disclosure, the percentage of the media scan sample allocated to each sensitivity tier can be skewed such that sampling percentage allocated to a high sensitivity tier is greater than a sampling percentage allocated to a low sensitivity tier, thus minimizing scan sample and frequency while maintaining data reliability. For example, assuming for the purpose of illustration that sensitivity tier 275A has a higher sensitivity level than sensitivity tier 275B and that sensitivity tier 275C has the lowest sensitivity level. In this case, media scan sample 385 can be comprised of approximately 66% of the pages within the sample coming from sensitivity tier 275A, approximately 20% of the pages within the sample coming from sensitivity tier 275B, and approximately 13% of the pages within the sample coming from sensitivity tier 275C.

Figure 4:
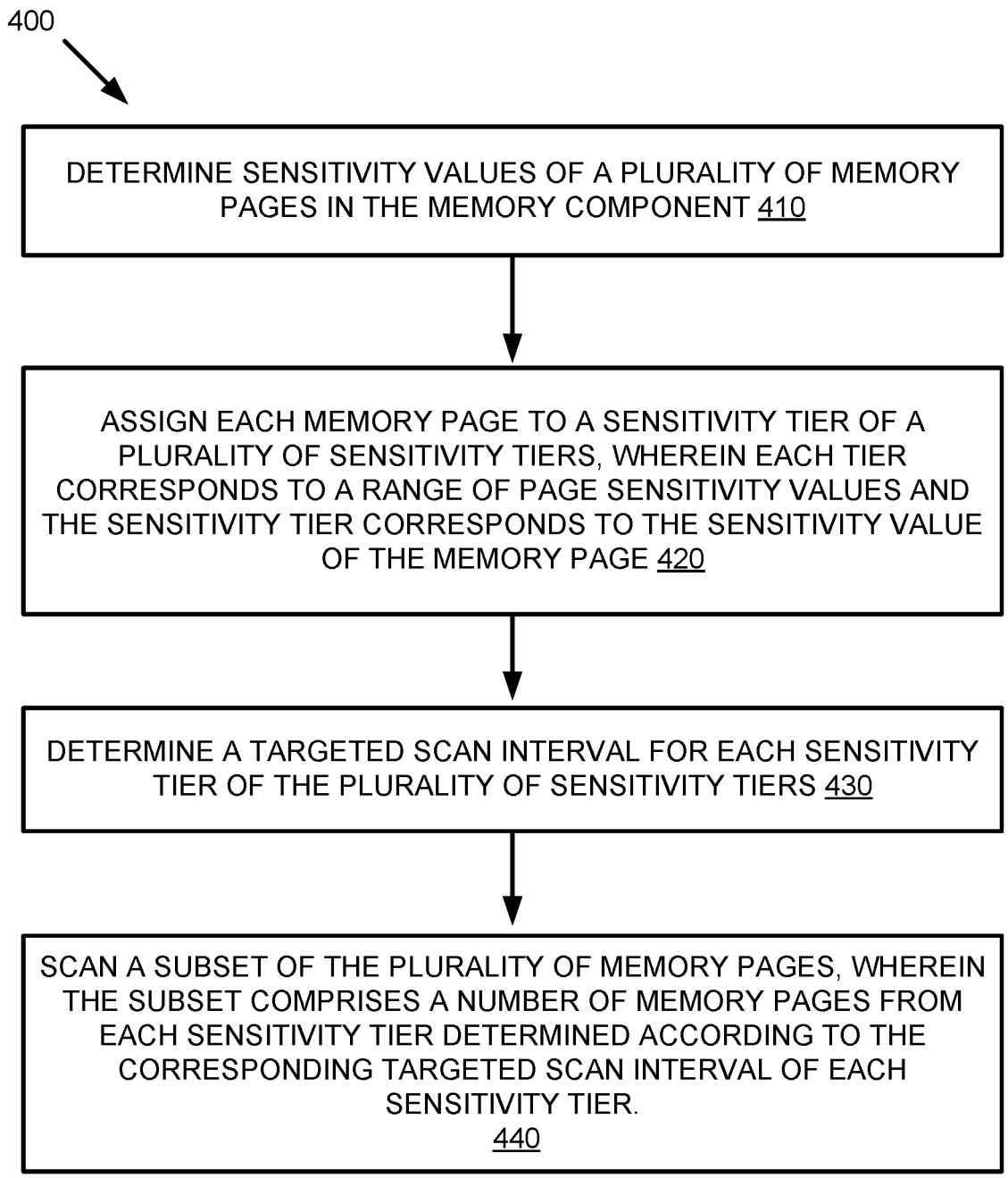
FIG. 4 is a flow diagram of an example method for performing selective accelerated sampling of failure-sensitive memory pages in accordance with some embodiments of the present disclosure.

FIG. 4 is a flow diagram of an example method for performing selective accelerated sampling of failure-sensitive memory pages in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by selective sampling module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device determines sensitivity values of a plurality of memory pages in the memory component 112. The processing device can determine the sensitivity value for each memory page based on the page's susceptibility to one or more failure metrics as indicated by the physical characteristics of the word-line associated with the page (e.g. width of the word-line).

At operation 420, the processing device assigns each memory page to a sensitivity tier of a plurality of sensitivity tiers, wherein each tier corresponds to a range of page sensitivity values and the sensitivity tier corresponds to the sensitivity value of the memory page. In one implementation, each tier in the plurality of sensitivity tiers can encompass a range of sensitivity values, and the processing device can assign each memory page to a static page list or a dynamic page list of one of the sensitivity tiers where the sensitivity value of the memory page lies within the range of sensitivity values of the tier.

At operation 430, the processing device determines a targeted scan interval for each sensitivity tier of the plurality of sensitivity tiers. In one implementation, a targeted scan interval for each sensitivity tier may be determined based on the physical characteristics of the memory component 112 that dictate the susceptibility of the memory component to failure mechanisms. In one implementation, a memory cell with a high susceptibility rate to failure may have a short targeted scan interval, whereas a memory cell with a low susceptibility rate to failure may have a long targeted scan interval. Examples of relevant physical characteristics include aspects of the memory component dictated by system specifications, memory cell margins, and failure sensitivity of the memory component. Memory cell margins can refer to a valley margin that is the area between two values of threshold voltage, the smaller the valley margin the more the memory cell can be susceptible to failure. System specification of the memory component can refer to the datasheet of the memory component, describing its technical capabilities, size, speed, output performance, and the like. The targeted scan interval of a sensitivity tier can represent a period of time where a subset of the memory pages assigned to the sensitivity tier may be scanned, such that a sensitivity tier with higher sensitivity values can have a smaller targeted scan interval (i.e. may be scanned more frequently) than a sensitivity tier with lower sensitivity values.

At operation 440, the processing device scans a subset of the memory pages consisting of a number of memory pages from each sensitivity tier determined according to the corresponding targeted scan interval of each sensitivity tier. In one implementation, the processing device can periodically scan a subset of memory pages from each sensitivity tier in the collection of sensitivity tiers as determined by the targeted scan interval of each sensitivity tier. In one implementation, a media scan sample that may be scanned at a given time may be divided into multiple portions, each portion allocated for one sensitivity tier, and the percentage of the media scan sample allocated to each portion may be proportionate with the sensitivity level of each sensitivity tier. For example, the percentage of the media scan sample allocated to each sensitivity tier may be based on the targeted scan interval of the sensitivity tier and on an operating model of memory component 112 (e.g. 8 hours per day power-on time). In another example. The processing device can define a list of media scan slots, to which a plurality of memory pages to be scanned can be assigned. Each sensitivity tier in the collection of tiers may be assigned a number of scan slots from the list proportionate with the sensitivity level of the sensitivity tier. The number of media scan slots can subsequently be populated with memory pages from the respective sensitivity tier, and the full populated list of scan slots may be scanned. Alternatively, the media scan slots can be populated on the fly, while the scan job is running. In this case, an order of a scan slot can determine the sensitivity tier from which it can be populated. For example, if tier-A has 60% sample rate, tier-B has 40% sample rate, and the scan sample has 10 slots, then slots 1 through 6 can be populated with memory pages from tier-A and slots 7 to 10 can be populated with memory pages from tier-B. In certain implementations, a random number strategy can be used first to select a sensitivity tier to populate the media scan slots. Similarly, a random number strategy can be used to select memory pages from the selected tier for scanning.

Figure 5:
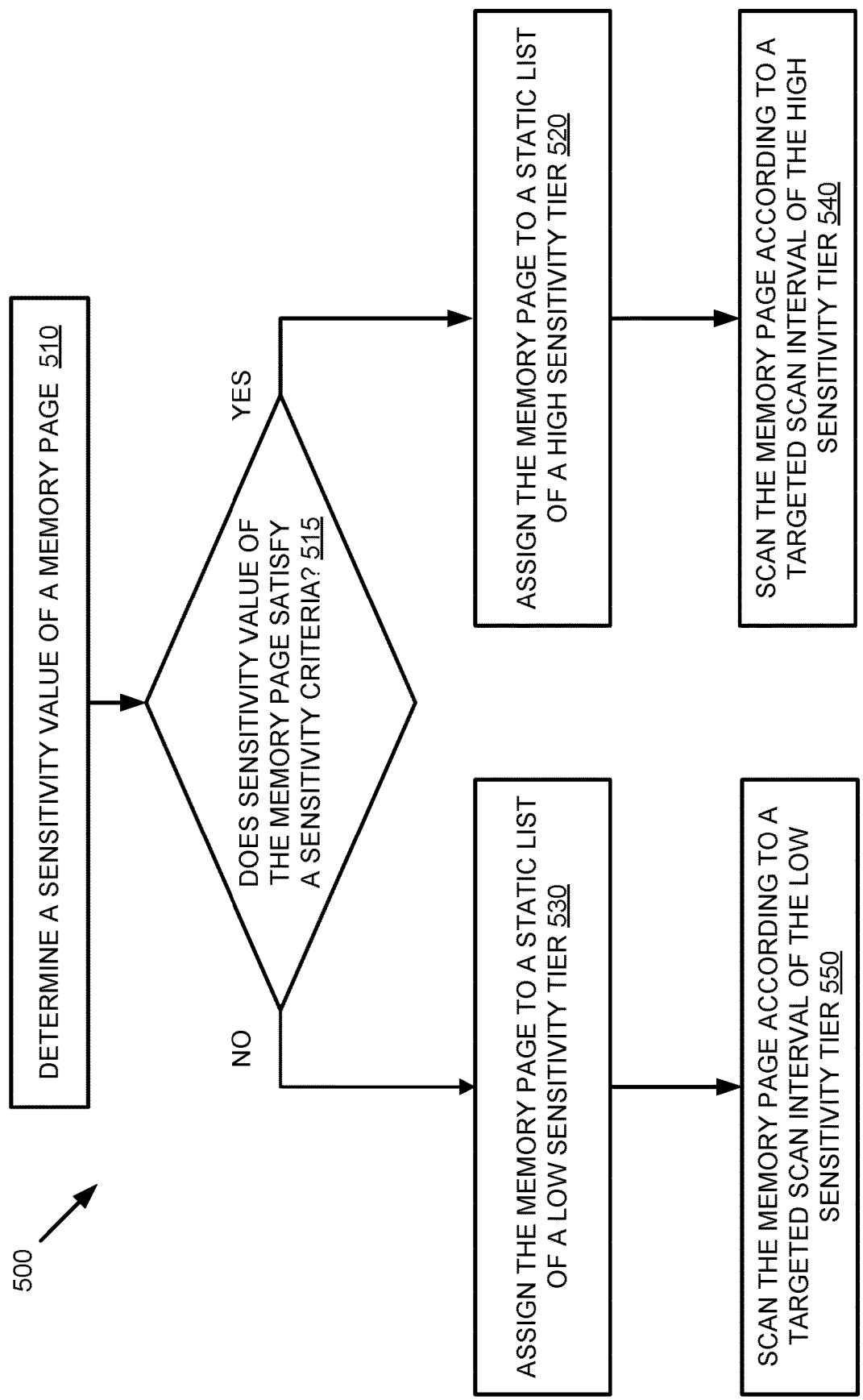
FIG. 5 is a flow diagram of an example method for assigning memory pages to a static list of high sensitivity tier or a low sensitivity tier, in accordance with some embodiments of the present disclosure.

FIG. 5 is a flow diagram of an example method for assigning memory pages to a static list of a high sensitivity tier or a low sensitivity tier, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by selective sampling module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device determines a sensitivity value of a memory page in the memory component 112. The processing device can determine the sensitivity value for each memory page based on the page's susceptibility to one or more failure metrics as indicated by the physical characteristics of the word-line associated with the page (e.g. width of the word-line). Relevant failure metrics include cross-temperature, read disturb, and retention response of the word-line.

At operation 515, the processing device determines whether the sensitivity value of the memory page satisfies a predetermined sensitivity criteria associated with a high sensitivity tier. In one implementation, a range of sensitivity values may be associated with the high sensitivity tier. In this case, satisfying the sensitivity criteria may be found if the sensitivity value of the page is within the range of sensitivity values of the high sensitivity tier. In another implementation, a discrete set of sensitivity values may be associated with the high sensitivity tier may be determined. In this case, satisfying the sensitivity criteria may be found if the sensitivity value of the page matches one of the sensitivity values in the set of sensitivity values of the high sensitivity tier.

If the sensitivity value of the memory page satisfies the sensitivity criteria, at operation 520, the selective processing module 113 assigns the memory page to a static list of a high sensitivity tier. In one implementation, during the development and testing of memory component 112, qualification and validation data for word-lines within memory blocks of the memory sub-system 110 may be collected. During this collection process, a static a list of sensitive pages may be generated based on the manufacturing process (e.g. silicon technology) of the memory components 112, which can represent the static list of the high sensitivity tier.

At operation 540, the processing device scans the memory page according to a targeted scan interval of the high sensitivity tier. In one implementation, selective sampling module 113 can determine a targeted scan interval for the high sensitivity tier based on the physical characteristics of the memory component 112 including system specifications, memory cell margins, and failure sensitivity of the memory component 112. The targeted scan interval of the high sensitivity tier can represent a period of time where memory pages assigned to the high sensitivity tier may be scanned, such that the high sensitivity tier can have a smaller targeted scan interval (i.e. may be scanned more frequently) than the low sensitivity tier.

If the sensitivity value of the memory page does not satisfy the sensitivity criteria of the high sensitivity tier, at operation 530, the selective sampling module 113 assigns the memory page to a static list of a low sensitivity tier. In one implementation, during the collection of qualification and validation data of memory component 112, a static list of non-sensitive pages can be generated based on the manufacturing process (e.g. silicon technology) of the memory components 112, and this list can represent the static list of the low sensitivity tier.

At operation 550, the processing device scans the memory page according to a targeted scan interval of the low sensitivity tier. In one implementation, selective sampling module 113 can determine a targeted scan interval for the low sensitivity tier based on the physical characteristics of the memory component 112 including system specifications, memory cell margins, and failure sensitivity of the memory component 112. The targeted scan interval of the low sensitivity tier can represent a period of time where some percentage of the memory pages assigned to the low sensitivity tier may be scanned, such that the low sensitivity tier can have a greater targeted scan interval (i.e. may be scanned less frequently) than the high sensitivity tier.

Figure 6:
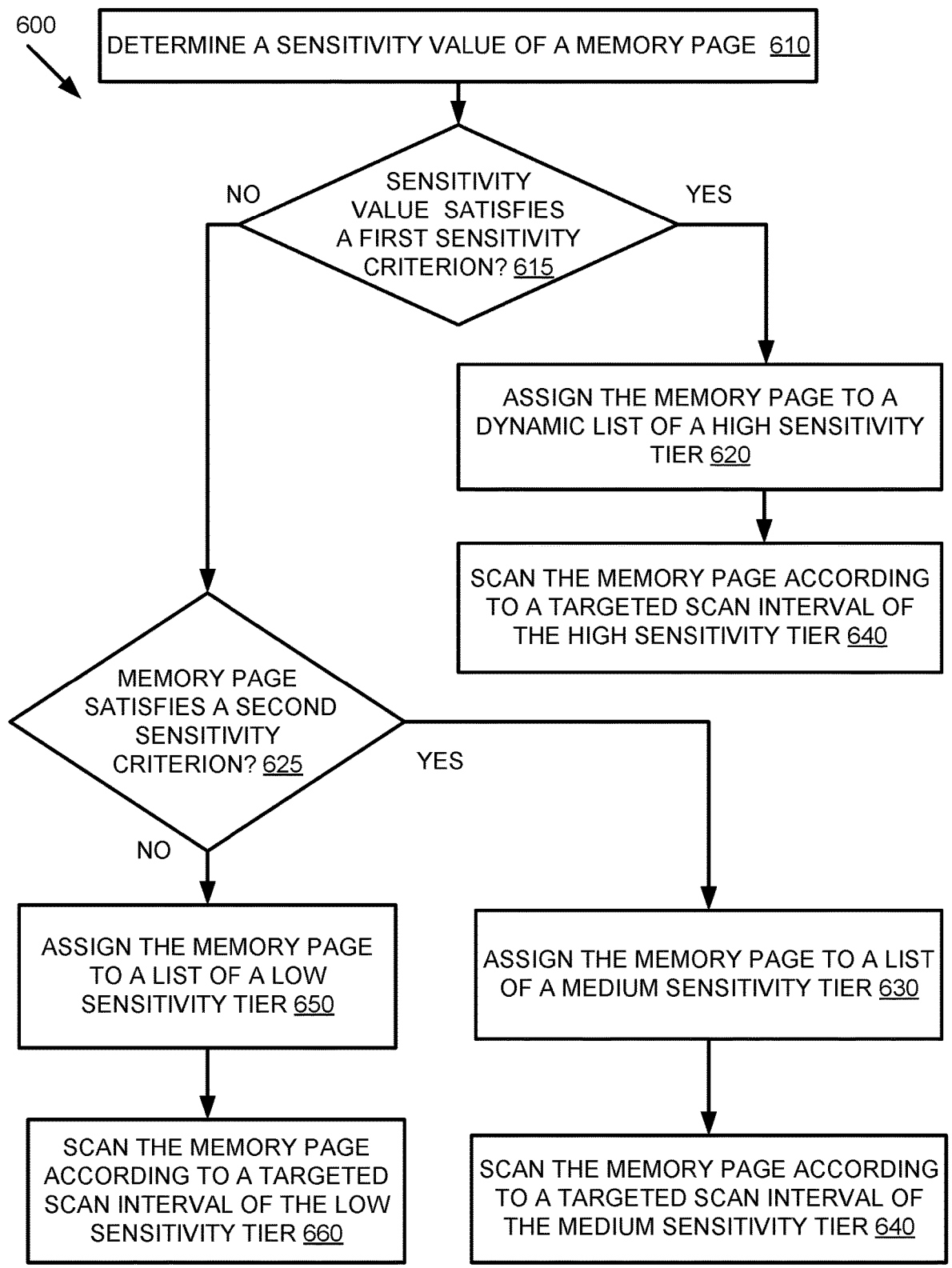
FIG. 6 is a flow diagram of an example method for assigning memory pages to a dynamic list of high sensitivity tier, medium sensitivity tier, or low sensitivity tier, in accordance with some embodiments of the present disclosure.

FIG. 6 is a flow diagram of an example method for assigning memory pages to a dynamic list of high sensitivity tier, medium sensitivity tier, and a low sensitivity tier, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by selective sampling module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing device determines a sensitivity value of a memory page in the memory component 112. The processing device can determine the sensitivity value for each memory page based on the page's susceptibility to one or more failure metrics as indicated by the physical characteristics of the word-line associated with the page (e.g. width of the word-line). Relevant failure metrics include cross-temperature, read disturb, and retention response of the word-line.

At operation 615, the processing device determines whether the sensitivity value of the memory page satisfies a predetermined first sensitivity criterion associated with a high sensitivity tier. As described above with response to FIG. 5, a range of sensitivity values may be associated with the high sensitivity tier. In this case, satisfying the first sensitivity criterion may be found if the sensitivity value of the page is within the range of sensitivity values of the high sensitivity tier. If the sensitivity value of the memory page satisfies the first sensitivity criterion, at operation 620, the selective processing module 113 assigns the memory page to a dynamic list of sensitive pages of the high sensitivity tier. In one implementation, the dynamic list of sensitive pages can be generated and updated dynamically throughout the lifetime of the memory component 112. In one implementation, a memory page is added to the dynamic list of sensitive pages if the memory page is triggering health issues for the memory component 112 (e.g. the page is triggering health issues if the page is causing a higher refresh rate of memory block 210 than other pages). In this case, selective processing module 113 can build a histogram plot to detect which word-lines have triggered memory block refresh more than others and can translate those word-lines to a list of sensitive memory pages that may be stored dynamically and associated with a high sensitivity tier. In another example, a machine learning mechanism may be utilized to dynamically determine the sensitive memory pages within memory block 210 based on multiple failure matrices. The dynamic list of memory pages can enable a new failure matrix to be identified during the lifetime of the memory component 112 and a resulting list of sensitive memory pages to be integrated into the sampling process with a least development and integration overhead.

At operation 640, the processing device scans the memory page according to a targeted scan interval of the high sensitivity tier. In one implementation, selective sampling module 113 can determine a targeted scan interval for the high sensitivity tier based on the physical characteristics of the memory component 112 including system specifications, memory cell margins, and failure sensitivity of the memory component 112. The targeted scan interval of the high sensitivity tier can represent a period of time where some percentage of the memory pages assigned to the high sensitivity tier may be scanned, such that the high sensitivity tier can have a smaller targeted scan interval (i.e. may be scanned more frequently) than a lower sensitivity tier.

If the sensitivity value of the memory page does not satisfy the first sensitivity criteria of the high sensitivity tier, at operation 625, the processing device determines whether the sensitivity value of the memory page satisfies a predetermined second sensitivity criterion associated with a medium sensitivity tier. In one implementation, the second criterion associated with the medium sensitivity tier may be to include in the medium sensitivity tier a collection of memory pages physically located at uniform intervals in memory block 210 (e.g. using a round robin algorithm, every fourth page in memory block 210), regardless of the pages' sensitivity values. This selection criteria may be used to ensure adequate sampling of memory pages across the entire memory component 112, for example to detect unforeseen errors that may not yet have been translated to page sensitivity values.

If the sensitivity value of the memory page satisfies the second sensitivity criterion, at operation 630, the selective processing module 113 assigns the memory page to a list of sensitive pages of the medium sensitivity tier. At operation 640, the processing device scans the memory page according to a targeted scan interval of the medium sensitivity tier. In one implementation, selective sampling module 113 can determine a targeted scan interval for the medium sensitivity tier based on the physical characteristics of the memory component 112 including system specifications, NAND margins, and failure sensitivity of the memory component 112. The targeted scan interval of the medium sensitivity tier can represent a period of time where some percentage of the memory pages assigned to the medium sensitivity tier may be scanned, such that the medium sensitivity tier can have a greater targeted scan interval (i.e. may be scanned less frequently) than the high sensitivity tier, but a smaller targeted scan interval (i.e. may be scanned more frequently) than the low sensitivity tier.

If the sensitivity value of the memory page does not satisfy the second sensitivity criteria of the medium sensitivity tier, at operation 650, the selective sampling module 113 assigns the memory page to a page list of a low sensitivity tier. In one implementation, a memory page that does not meet the first sensitivity criteria of the high sensitivity tier nor the second sensitivity criteria of the medium sensitivity tier may be added to the list of the low sensitivity tier by default. Lastly, at operation 660, the processing device scans the memory page according to a targeted scan interval of the low sensitivity tier. In one implementation, as described above with respect to FIG. 5, selective sampling module 113 can determine a targeted scan interval for the low sensitivity tier based on the physical characteristics of the memory component 112 including system specifications, NAND margins, and failure sensitivity of the memory component 112. The targeted scan interval of the low sensitivity tier can represent a period of time where some percentage of the memory pages assigned to the low sensitivity tier may be scanned, such that the low sensitivity tier can have a greater targeted scan interval (i.e. may be scanned less frequently) than the high sensitivity tier and the medium sensitivity tier.

Figure 7:
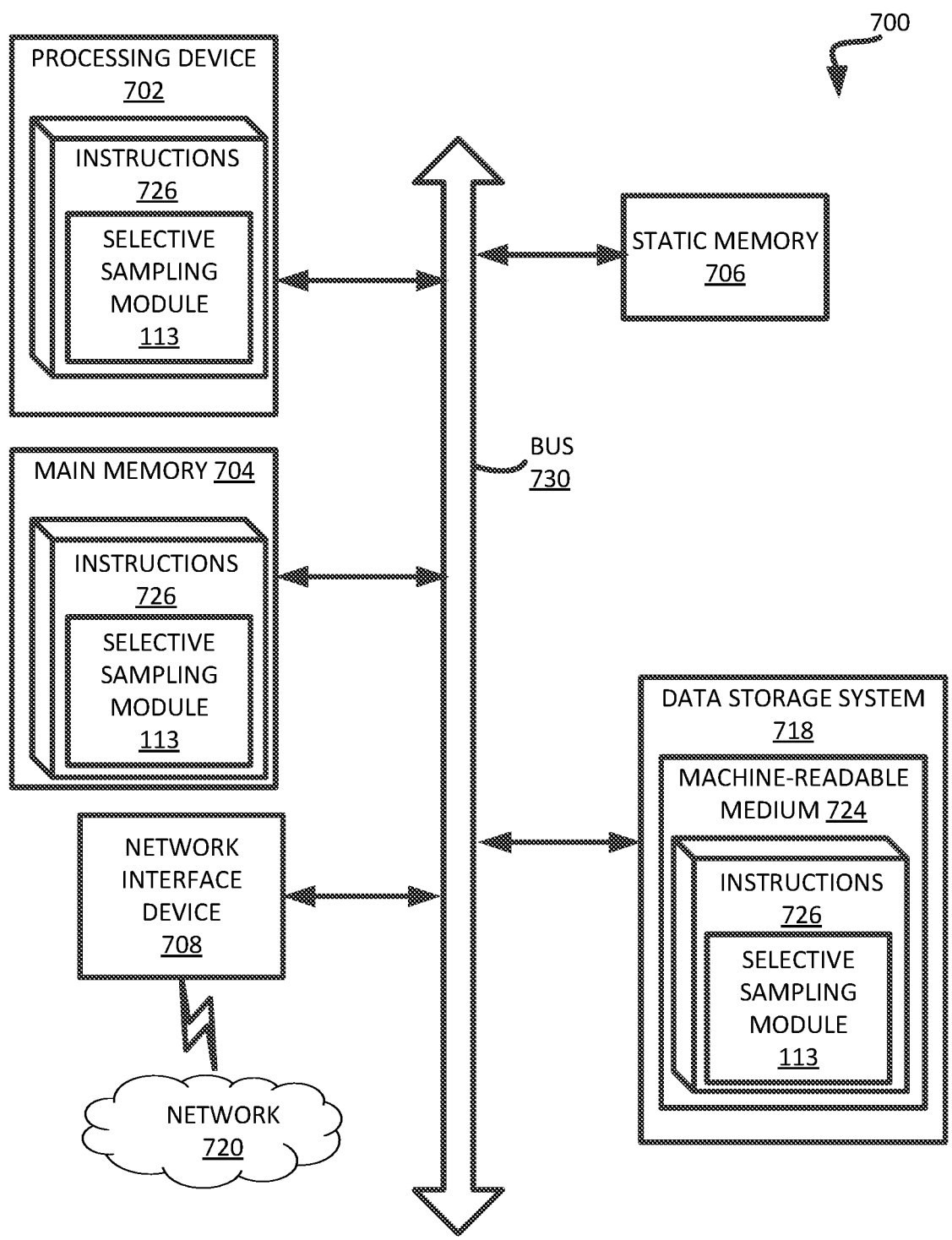
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to selective sampling module 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to selective sampling module 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, operatively coupled with the memory component, to:
identify a sensitivity value of a memory page in the memory component;
assign the memory page to a sensitivity tier of a plurality of sensitivity tiers based on the sensitivity value of the memory page, wherein each sensitivity tier has a corresponding range of sensitivity values;
determine a targeted scan interval for each sensitivity tier of the plurality of sensitivity tiers, wherein the targeted scan interval is based on at least one physical characteristic of the memory component, the physical characteristic comprising memory cell margins of the memory component; and
scan a subset of a plurality of memory pages in the memory component, wherein the subset comprises a number of memory pages from each sensitivity tier identified according to the corresponding targeted scan interval of each sensitivity tier.

2. The system of claim 1, wherein the number of memory pages from each sensitivity tier comprises a percentage of a media scan sample determined based on the targeted scan interval of the sensitivity tier and an operating model of the memory component, wherein the operating model comprises a number of hours per day for which the memory component is typically powered on.

3. The system of claim 1, wherein the at least one physical characteristic of the memory component further comprises system specifications or failure sensitivity of the memory component.

4. The system of claim 1, wherein to identify the sensitivity value of the memory page, the processing device is further to determine a failure metric based on a width of a word-line associated with the memory page.

5. The system of claim 1, wherein to assign a memory page to a sensitivity tier, the processing device is further to assign the memory page to a dynamic list of sensitive pages based on a refresh rate of a memory block caused by the memory page.

6. The system of claim 1, wherein the processing device is further to assign a plurality of memory pages located at uniform intervals in a memory block to a sensitivity tier.

7. A method comprising:
identifying, by a processing device, a sensitivity value of a memory page in the memory component;
assigning the memory page to a sensitivity tier of a plurality of sensitivity tiers based on the sensitivity value of the memory page, wherein each sensitivity tier has a corresponding range of sensitivity values;
determining a targeted scan interval for each sensitivity tier of the plurality of sensitivity tiers, wherein the targeted scan interval is based on at least one physical characteristic of the memory component, the physical characteristic comprising memory cell margins of the memory component; and
scanning a subset of a plurality of memory pages in the memory component, wherein the subset comprises a number of memory pages from each sensitivity tier identified according to the corresponding targeted scan interval of each sensitivity tier.

8. The method of claim 7, wherein the number of memory pages from each sensitivity tier comprises a percentage of a media scan sample determined based on the targeted scan interval of the sensitivity tier and an operating model of the memory component, wherein the operating model comprises a number of hours per day for which the memory component is typically powered on.

9. The method of claim 7, wherein the at least one physical characteristic of the memory component further comprises system specifications or failure sensitivity of the memory component.

10. The method of claim 7, wherein identifying the sensitivity value of a memory page comprises determining a failure matrix based on width of a word-line associated with the memory page.

11. The method of claim 7, wherein assigning the memory page to a sensitivity tier comprises assigning the memory page to a dynamic list of sensitive pages based on a refresh rate of a memory block caused by the memory page.

12. The method of claim 7 further comprises assigning a plurality of memory pages located at uniform intervals in a memory block to a sensitivity tier.

13. A non-transitory computer-readable storage medium comprising instructions that, when executed by a processing device, cause the processing device to:
define a plurality of media scan slots, to which a plurality of memory pages, corresponding to a plurality of sensitivity tiers, is to be assigned, wherein each sensitivity tier in the plurality of sensitivity tiers comprises a range of sensitivity values and a set of memory pages corresponding to the range of sensitivity values;
assign a plurality of the media scan slots to each sensitivity tier of the plurality of sensitivity tiers, wherein a first number of slots in a first plurality of slots assigned to a first sensitivity tier is greater than a second number of slots in a second plurality of slots assigned to a second sensitivity tier wherein the sensitivity values corresponding to the first tier are greater than the sensitivity values corresponding to the second tier, and wherein each of the plurality of sensitivity tiers is associated with a corresponding targeted scan interval based on at least one physical characteristic of the memory component, the physical characteristic comprising memory cell margins of the memory component;
assign, for each sensitivity tier of the plurality of sensitivity tiers, a memory page of the list of memory pages of the respective tier to a media scan slot of the plurality of media scan slots assigned to the respective tier; and
scan the plurality of memory pages assigned to the number of media scan slots.

14. The non-transitory computer-readable storage medium of claim 13, wherein at least one physical characteristic of the memory component further comprises system specifications or failure sensitivity of the memory component.

15. The non-transitory computer-readable storage medium of claim 14, wherein the first number of slots is based on the targeted scan interval of the respective sensitivity tier.

16. The non-transitory computer-readable storage medium of claim 13, wherein each sensitivity tier of the plurality of sensitivity tiers further comprises a plurality of memory pages physically located at uniform intervals in a memory block.

17. The non-transitory computer-readable storage medium of claim 13, wherein the memory page of the list of memory pages of the respective tier has a sensitivity value, the sensitivity value corresponds to a range of sensitivity values associated with the respective sensitivity tier.

18. The non-transitory computer-readable storage medium of claim 13, wherein the number of media scan slots is based at least on one of system specifications, memory cell margins, or failure sensitivity of the memory component.

* * * * *